United States Patent
Potticary et al.

(10) Patent No.: US 11,584,191 B2
(45) Date of Patent: Feb. 21, 2023

(54) METHODS AND SYSTEM FOR A DEGAS BOTTLE

(71) Applicant: Ford Global Technologies, LLC, Dearborn, MI (US)

(72) Inventors: Simon Potticary, London (GB); Robert Gosling, Basildon (GB)

(73) Assignee: Ford Global Technologies, LLC, Dearborn, MI (US)

( * ) Notice: Subject to any disclaimer, the term of this patent is extended or adjusted under 35 U.S.C. 154(b) by 247 days.

(21) Appl. No.: 16/504,772

(22) Filed: Jul. 8, 2019

(65) Prior Publication Data

US 2020/0009939 A1 Jan. 9, 2020

(30) Foreign Application Priority Data

Jul. 9, 2018 (GB) ...................................... 1811238

(51) Int. Cl.
*F01P 11/02* (2006.01)
*B60H 1/00* (2006.01)
(Continued)

(52) U.S. Cl.
CPC .......... *B60H 1/00571* (2013.01); *F01P 7/165* (2013.01); *F01P 11/02* (2013.01); *F01P 11/028* (2013.01); *F01P 11/029* (2013.01); *F25B 43/043* (2013.01); *F25D 17/02* (2013.01); *Y02E 60/10* (2013.01)

(58) Field of Classification Search
CPC ....... B60H 1/00571; F01P 7/165; F01P 11/02; F01P 11/028; F01P 11/029
See application file for complete search history.

(56) References Cited

U.S. PATENT DOCUMENTS 4,738,228 A * 4/1988 Jenz ...................... F01P 11/029
123/41.27
5,329,889 A 7/1994 Caldwell
(Continued)

FOREIGN PATENT DOCUMENTS

DE 102007054855 A1 * 5/2009 ............ F01P 11/029
GB 2452070 A 2/2009
(Continued)

OTHER PUBLICATIONS

Great Britain Intellectual Property Office, Combined Search and Examination Report under Sections 17 and 18(3) Issued in Application No. GB1811238.3, dated Nov. 30, 2018, 7 pages.

*Primary Examiner* — Eric S Ruppert
(74) *Attorney, Agent, or Firm* — Vincent Mastrogiacomo; McCoy Russell LLP

(57) ABSTRACT

Methods and systems are provided for a cooling system. In one example, a system comprising a housing comprising a first chamber fluidly coupled to a first cooling circuit and a second chamber fluidly coupled to a second cooling circuit. A reservoir is arranged vertically above each of the first chamber and the second chamber within the housing. A transverse wall fluidly separates the reservoir from the first and second chambers and a dividing wall physically coupled to the transverse wall, separates the first and second chambers from one another. Each of the transverse wall, dividing wall, first chamber, and the second chamber are arranged vertically below a minimum fill line of the reservoir.

17 Claims, 10 Drawing Sheets

(51) Int. Cl.
*F25B 43/04* (2006.01)
*F25D 17/02* (2006.01)
*F01P 7/16* (2006.01)

(56) References Cited

U.S. PATENT DOCUMENTS

| | | | | |
|---|---|---|---|---|
| 5,680,833 | A * | 10/1997 | Smith | F01P 11/029 123/41.54 |
| 6,216,646 | B1 * | 4/2001 | Smith | F01P 11/029 123/41.54 |
| 2006/0137663 | A1 * | 6/2006 | Vaught | B01D 19/0042 96/220 |
| 2010/0206882 | A1 * | 8/2010 | Wessels | F01P 11/029 220/562 |
| 2011/0210125 | A1 * | 9/2011 | Kardos | F01P 11/029 220/502 |
| 2011/0284107 | A1 * | 11/2011 | Ciak | F01P 11/029 137/563 |
| 2015/0138805 | A1 * | 5/2015 | Salter | B60Q 3/30 362/510 |
| 2015/0144079 | A1 * | 5/2015 | Iafrate | F01P 11/028 123/41.01 |
| 2015/0345368 | A1 * | 12/2015 | Le Poul | B65D 41/04 123/41.51 |
| 2016/0054169 | A1 * | 2/2016 | Gaudiau | G05D 9/12 73/313 |
| 2016/0146093 | A1 | 5/2016 | Takahashi et al. | |
| 2016/0222869 | A1 * | 8/2016 | Nishiguchi | F01P 11/029 |
| 2017/0130641 | A1 * | 5/2017 | Kennedy | F01P 11/04 |
| 2017/0191767 | A1 | 7/2017 | Elkenkamp et al. | |
| 2017/0274758 | A1 * | 9/2017 | Cho | B60K 15/03 |
| 2019/0170053 | A1 * | 6/2019 | Mark | F01P 11/029 |
| 2020/0408134 | A1 * | 12/2020 | Asano | F01P 11/029 |

FOREIGN PATENT DOCUMENTS

| | | | |
|---|---|---|---|
| JP | H10266856 A | 10/1998 | |
| SE | 539924 C2 * | 1/2018 | ........... F01P 11/029 |
| WO | 03042516 A2 | 5/2003 | |

\* cited by examiner

METHODS AND SYSTEM FOR A DEGAS BOTTLE

CROSS REFERENCE TO RELATED APPLICATION

The present application claims priority to United Kingdom patent application No. 1811238.3, filed on Jul. 9, 2018. The entire contents of the above-listed application are hereby incorporated by reference for all purposes.

FIELD

The present description relates generally to a segmented degas bottle for coolant circuits of varying temperatures.

BACKGROUND/SUMMARY

Vehicles may utilize a variety of components that demand cooling during operation. Cooling circuits, which may circulate coolant, may provide the demanded cooling. The cooling circuits may utilize a degas bottle to decrease a pressure of the coolant flowing therethrough to enable the coolant to continue cooling the various components. In some examples, the degas bottle may be a combined coolant reservoir and degas bottle arranged as a highest component within the coolant circuit.

Each component may have a threshold operating temperature and a corresponding cooling circuit, wherein multiple combined coolant reservoirs and degas bottles may be used with a single combined coolant reservoir and degas bottle being used for each of the cooling circuits. However, the inventors have identified some issues with the approach described above. For example, multiple coolant fill points are provided to fill the different combined coolant reservoirs and degas bottles. Furthermore, the combined coolant reservoir and degas bottles may be difficult to package within the vehicle as packaging restraints continue to decrease. One example approach is shown by Ngy et al. in WO2003042516. Therein, a wall is arranged within an expansion tank to divide the tank into a first chamber and a second chamber. Each of the first chamber and the second chamber comprise separate inlets and outlets such that a first coolant circuit may be fluidly coupled to the first chamber and a second coolant circuit may be fluidly coupled to the second chamber without mixing coolant from the two circuits.

However, the inventors have identified some issues with the approaches described above. For example, the wall arranged in the expansion tank to divide the first and second chambers may block efficient filling of the separate chambers. Once filled, the expansion tank may not be able to maintain a desired coolant volume for each of the first and second circuits. This occurs in the example shown by Ngy as the wall extends to a location above a minimum fill line. However, if the wall is too low, too much coolant mixing and heat transfer may occur, which may reduce a cooling efficiency of the coolant circuits, thereby adjusting component temperatures to a temperature outside of a desired operating range.

In one example, the issues described above may be addressed by a system for a reservoir arranged vertically above a first chamber and a second chamber within a single housing, wherein a dividing wall fluidly seals the first chamber from the second chamber, and a transverse wall arranged below a minimum fill line of the housing, the transverse wall comprising apertures configured to flow coolant from the reservoir to the first and second chambers. In this way, a packaging space may be preserved while a filling efficiency of the coolant chambers may be maintained or increased.

As one example, the dividing wall also thermally insulates the first chamber from the second chamber such that the first chamber may receive coolant from a first coolant circuit comprising a first coolant temperature and the second chamber may receive coolant from a second coolant circuit comprising a second coolant temperature, different than the first coolant temperature. By doing this, two coolant circuits with different operating temperatures may utilize a combined reservoir and degas bottle.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1A:
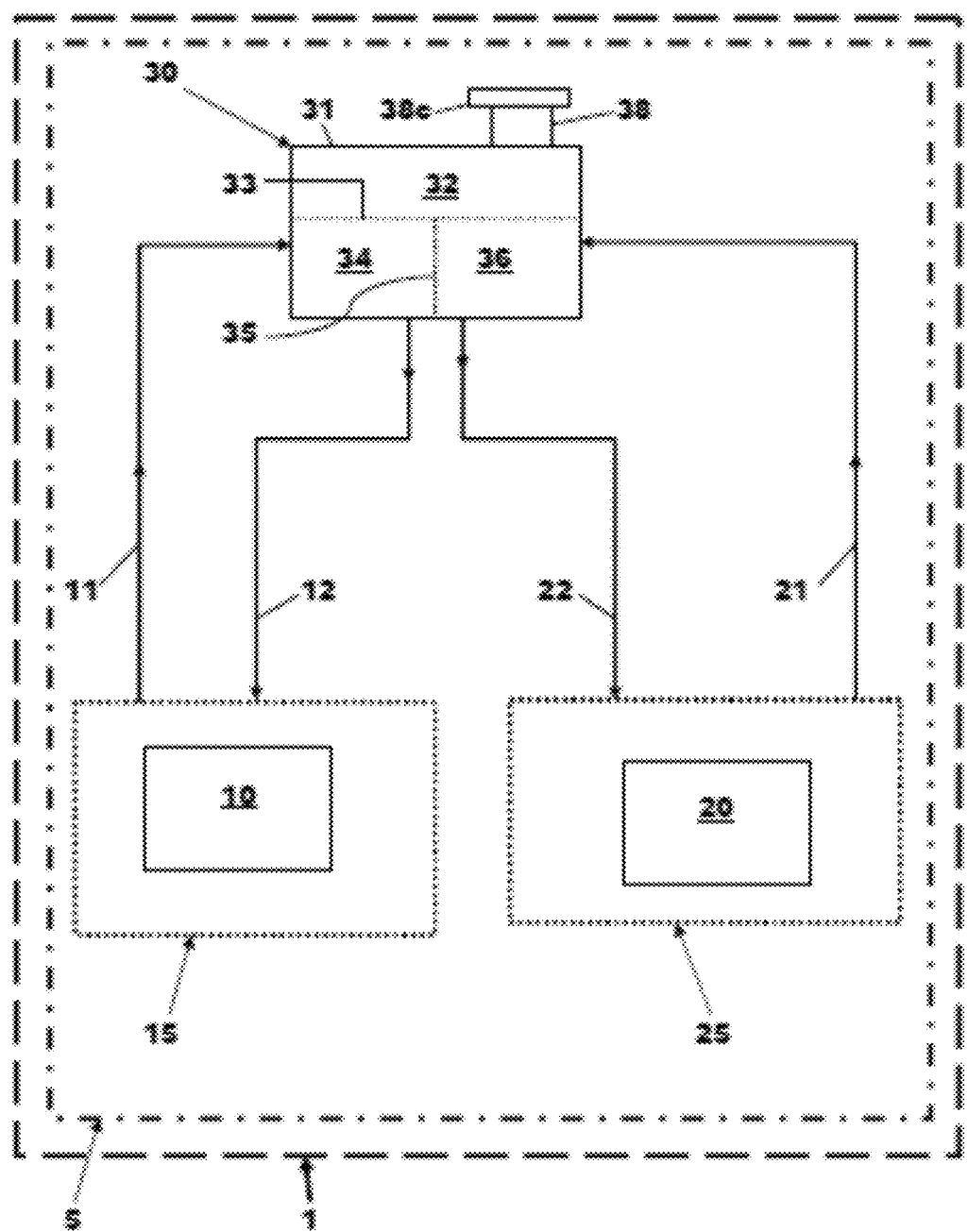
FIG. 1A shows a schematic diagram of a motor vehicle having a cooling system that includes a first embodiment combined reservoir and degas bottle.

The following description relates to systems and methods for a combined reservoir and degas bottle for receiving liquid coolant from two or more separate cooling circuits each having a different operating temperature threshold. The combined reservoir and degas bottle comprise an upper reservoir chamber including a single filler to permit the reservoir chamber to be filled with liquid coolant and a like number of separate degas chambers as there are separate cooling circuits wherein each of the degas chambers has respective inlet and outlet connections for connecting the degas chamber to a respective one of the separate cooling circuits. Each of the degas chambers is separated from an adjacent degas chamber by a dividing wall forming a thermal barrier therebetween and is separated from the reservoir chamber by a transverse wall having at least one transfer aperture in communication with the respective degas chamber to allow top-up coolant to pass in use from the reservoir chamber to the respective degas chamber and any extracted gas to flow from the degas chamber to the reservoir chamber.

The bottle may have a body defining the upper reservoir chamber and the like number of degas chambers as there are separate cooling circuits.

The dividing wall may extend from a bottom of the respective degas chamber to the transverse wall separating it from the reservoir chamber.

The transverse wall may be positioned so as to be located in use at a position below a minimum coolant fill level of the bottle.

The inlet connection for each degas chamber may be positioned above the outlet connection of that degas chamber so that coolant flows in use downwardly as it passes through the degas chamber.

There may be two single transfer apertures in the transverse wall each being positioned towards an opposite end of the respective degas chamber with which it communicates to where coolant enters the respective degas chamber from the respective inlet connection of that degas chamber.

Alternatively, there may be a plurality of small transfer apertures having a transverse dimension of 1 to 3 mm in the or each transverse wall communicating with each degas chamber.

There may be a single transverse wall separating all of the degas chambers from the reservoir chamber.

There may be first and second degas chambers arranged in a side by side relationship below the reservoir chamber.

The first degas chamber may be connected in use to a first cooling circuit and the second degas chamber may be connected in use to a second cooling circuit.

The dividing wall separating the first degas chamber from the second degas chamber may be a double wall having a first limb in contact in use with coolant in the first degas chamber and a second limb in contact in use with coolant in the second degas chamber.

The double wall may be a V-shaped double wall.

Coolant may flow in use from a first end of the bottle to a second end of the bottle in the first degas chamber and from the second end of the bottle to the first end of the bottle in the second degas chamber.

Additionally, a cooling system comprising two or more separate cooling circuits each having a different operating temperature threshold and a combined reservoir and degas bottle constructed is fluidly coupled to the combined reservoir chamber and degas bottle.

The system may have a first cooling circuit and a second cooling circuit, the bottle may have first and second degas chambers, the first degas chamber may be connected to the first cooling circuit and the second degas chamber may be connected to the second cooling circuit.

The first and second degas chambers may be arranged in a side by side relationship in the bottle below the reservoir chamber.

The first cooling circuit may have one or more heat sources demanding liquid cooling and the second cooling circuit may have one or more heat sources demanding liquid cooling.

The first cooling circuit may have a heat exchanger to dissipate heat from the coolant flowing through the first cooling circuit and a circulation pump to circulate the coolant through the first cooling circuit. The second cooling circuit may have a heat exchanger to dissipate heat from the coolant flowing through the second cooling circuit and a circulation pump to circulate the coolant through the second cooling circuit.

The cooling system described above may be arranged on a vehicle. In one example, the vehicle may be a hybrid vehicle. The motor vehicle may have a heat source demanding liquid cooling in the form of one of an internal combustion engine, a high voltage battery, an alternating current high voltage battery charger, a direct current to direct current converter, and a high power electronic controller.

Figure 1B:
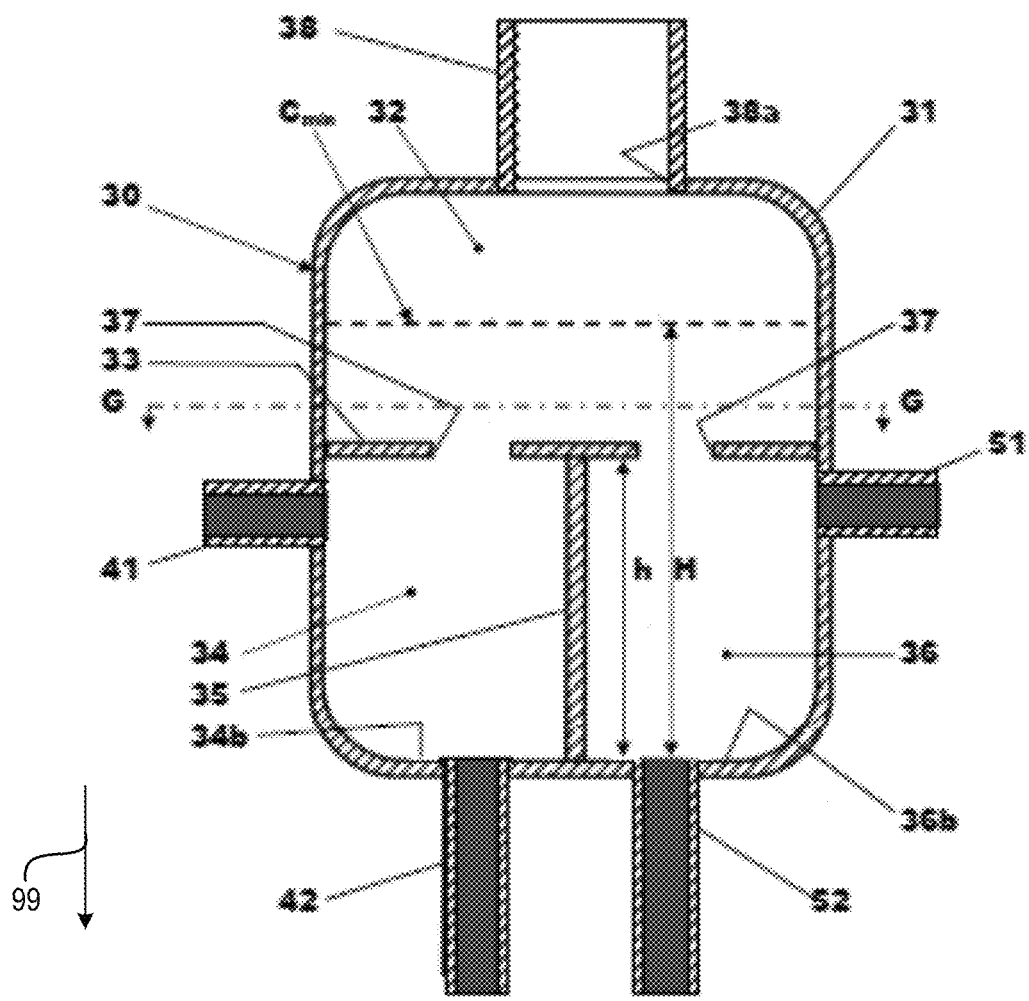
FIG. 1B shows a diagrammatic, staggered cross-section through the combined reservoir and degas bottle of FIG. 1A.
Figure 1C:
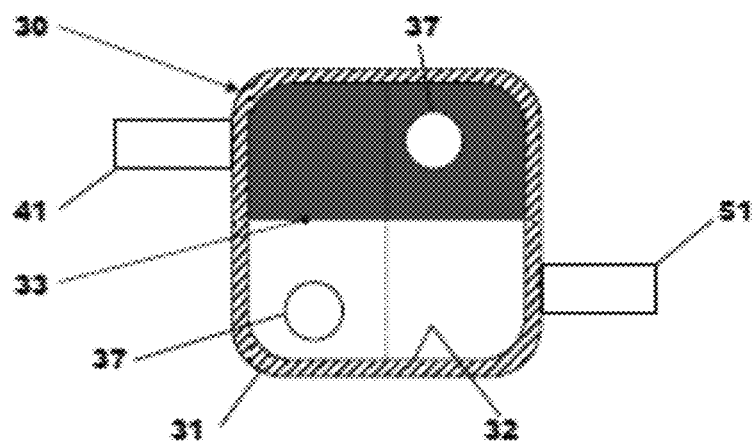
FIG. 1C shows a cross-section of the embodiment of FIG. 1B showing positions of two transfer apertures.
Figure 2:
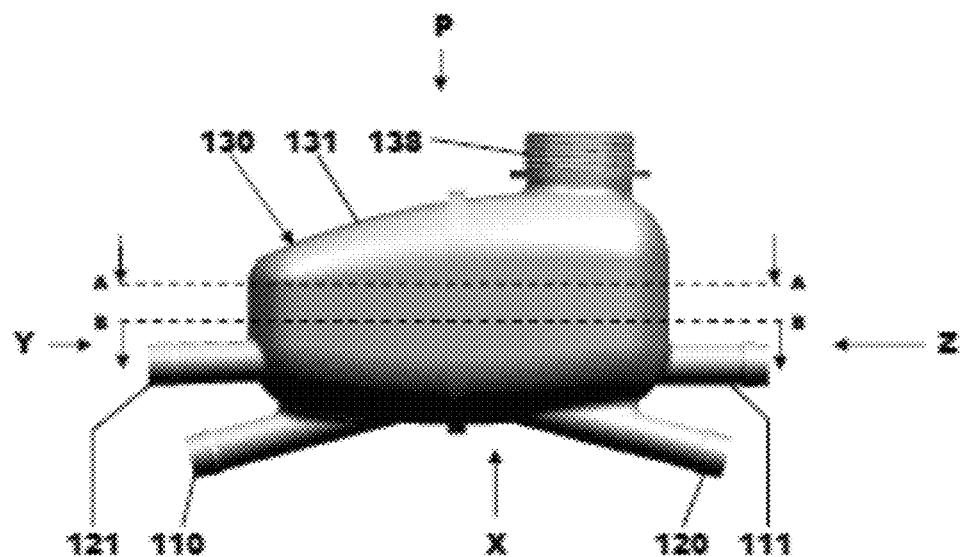
FIG. 2 shows a side view of a second embodiment of a combined reservoir and degas bottle.
Figure 3:
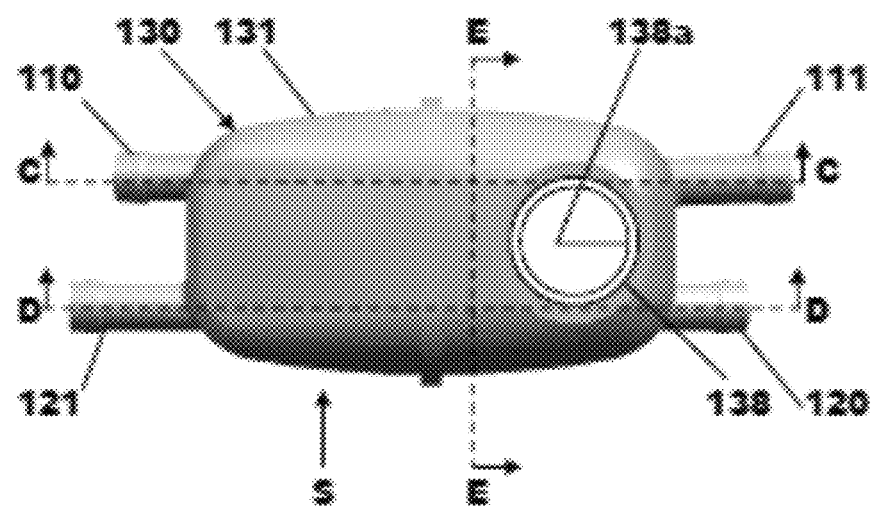
FIG. 3 shows a plan view of the second embodiment.
Figure 4:
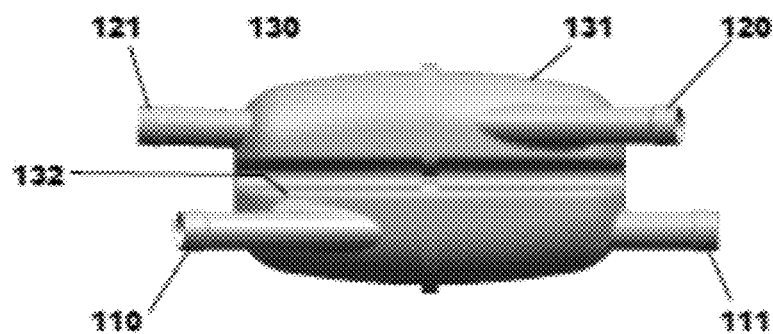
FIG. 4 shows an underside view of the second embodiment.
Figure 5:
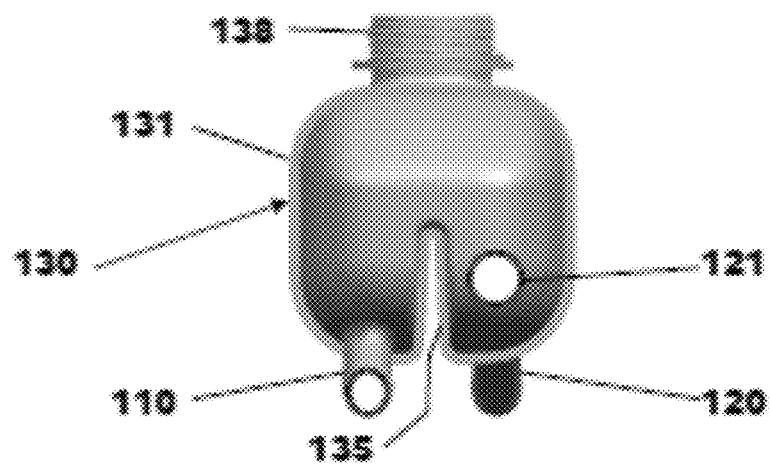
FIGS. 5 and 6 show side views of the second embodiment.
Figure 6:
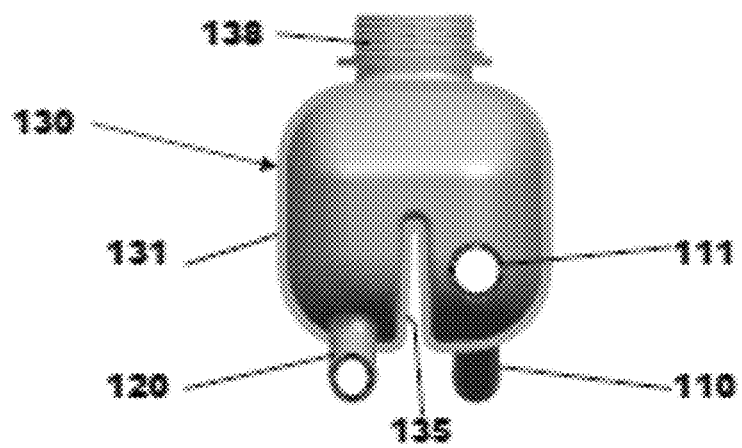
Figure 7:
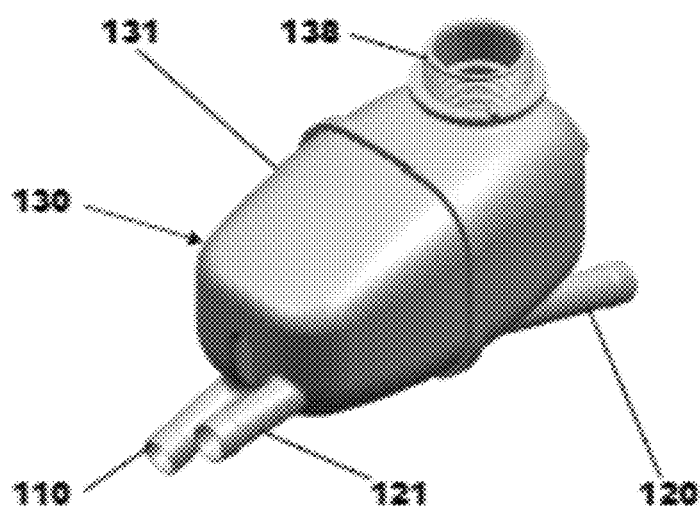
FIG. 7 shows a perspective view of the second embodiment.
Figure 8:
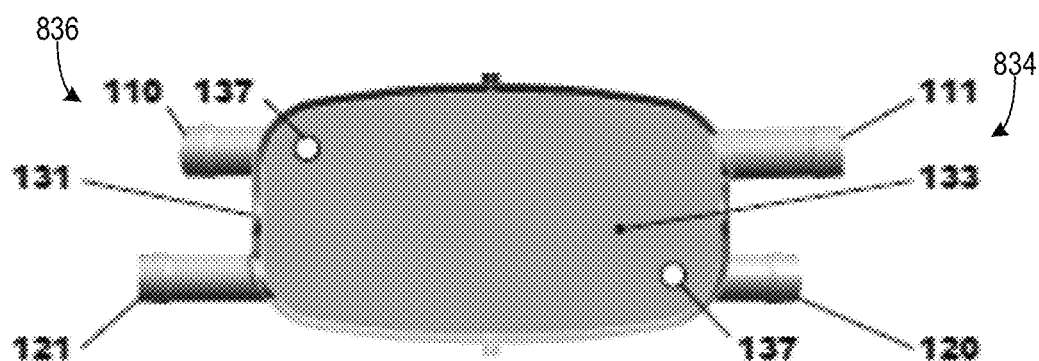
FIG. 8 shows a first cross-sectional view of the second embodiment revealing a transverse wall.
Figure 9:
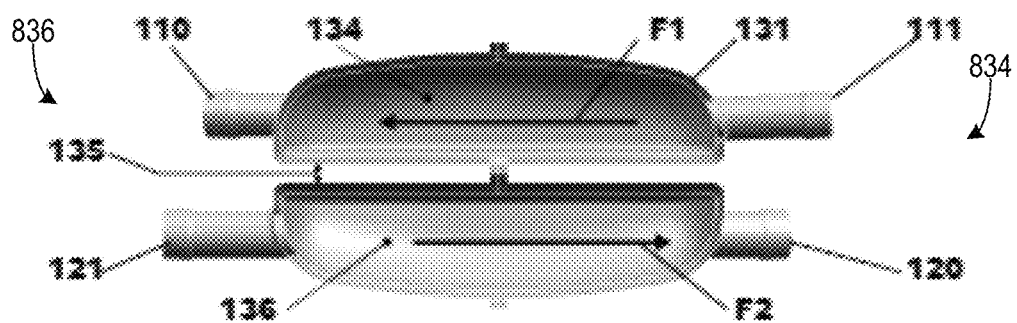
FIG. 9 shows a second cross-section view of the second embodiment revealing the degas chambers in a side-by-side relationship.
Figure 10:
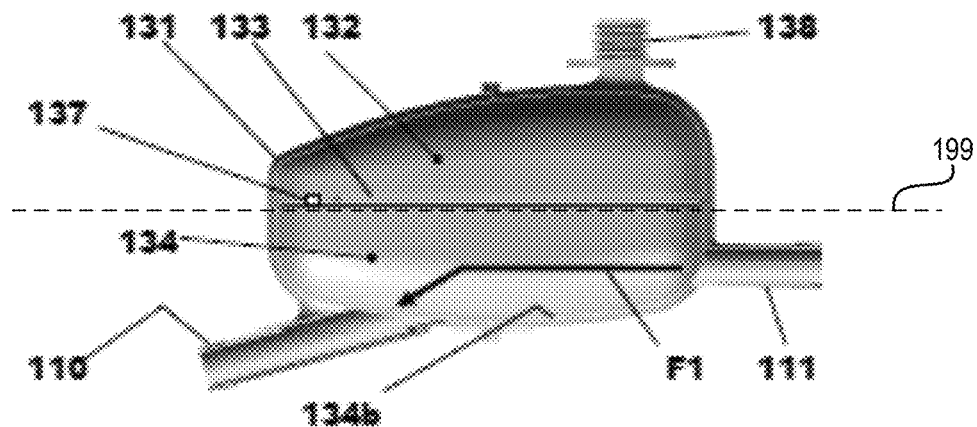
FIGS. 10, 11, and 12 illustrate further cross-sectional views of the second embodiment.
Figure 11:
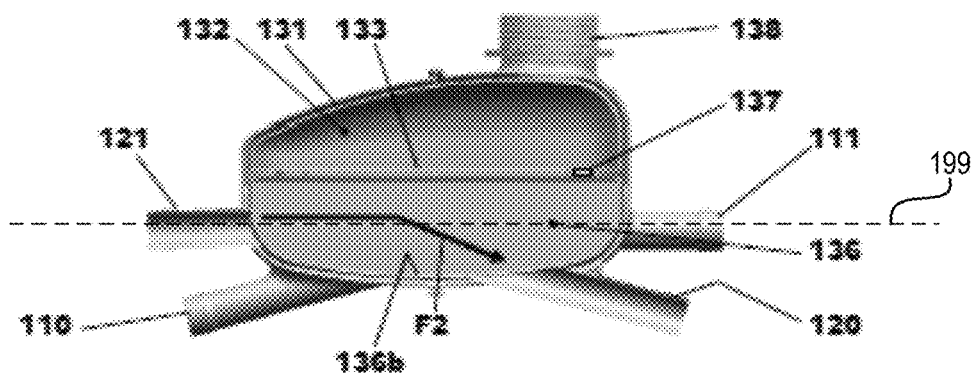
Figure 12:
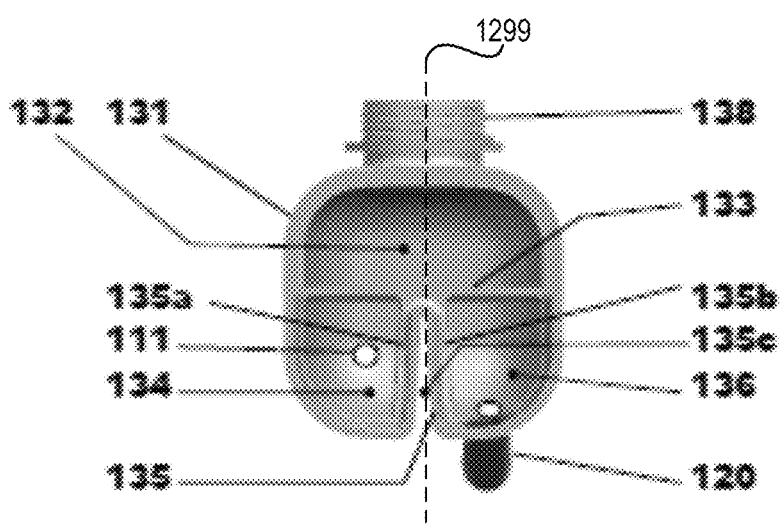
Figure 13:
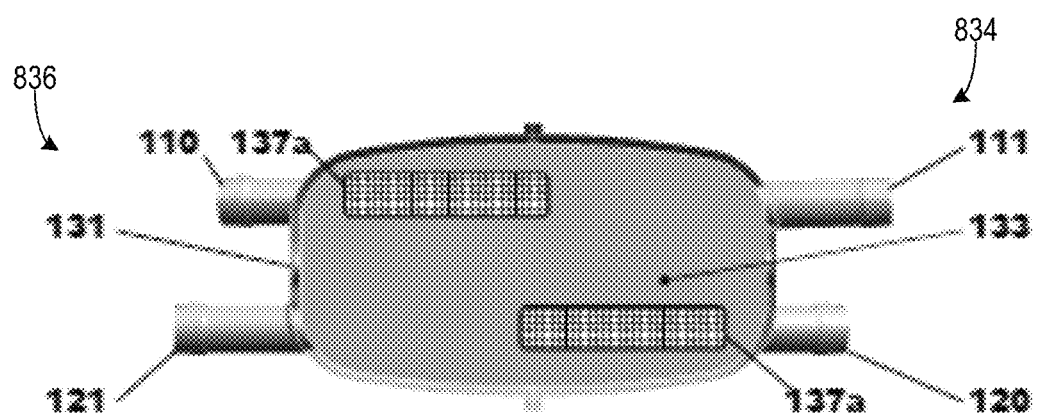
FIG. 13 illustrates a cross-sectional view of the second embodiment that illustrates an alternative, optional arrangement compared to the first cross-sectional view of FIG. 8.
Figure 15:
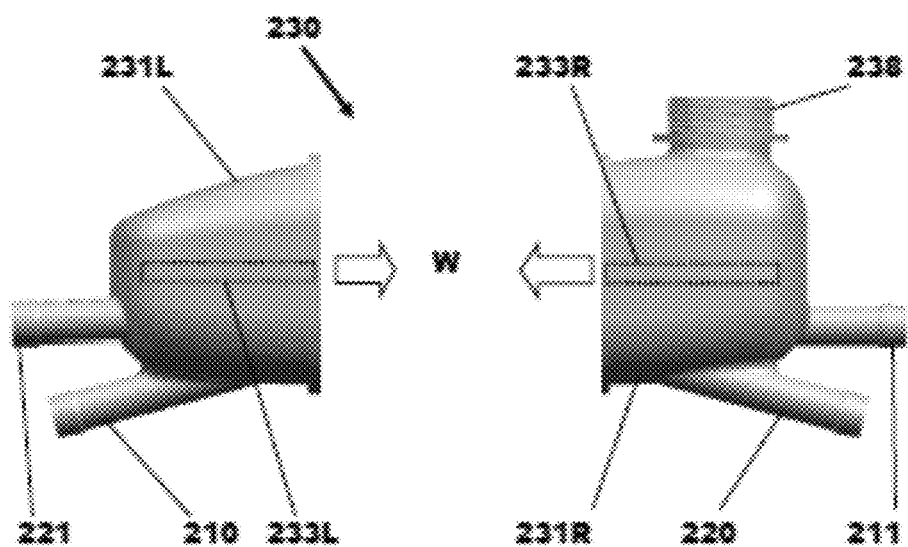
FIG. 15 illustrates a second exploded view of the combined reservoir and degas bottle.
Figure 14:
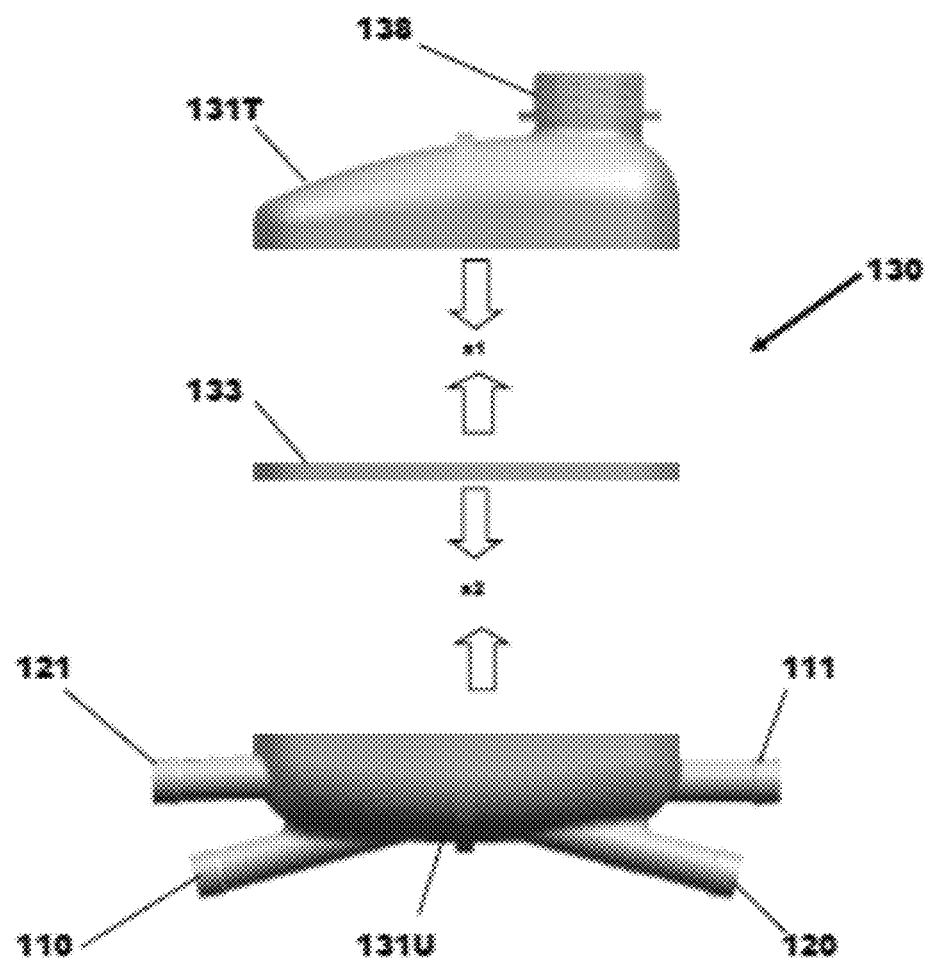
FIG. 14 illustrates a first exploded view of the combined reservoir and degas bottle.
Figure 16:
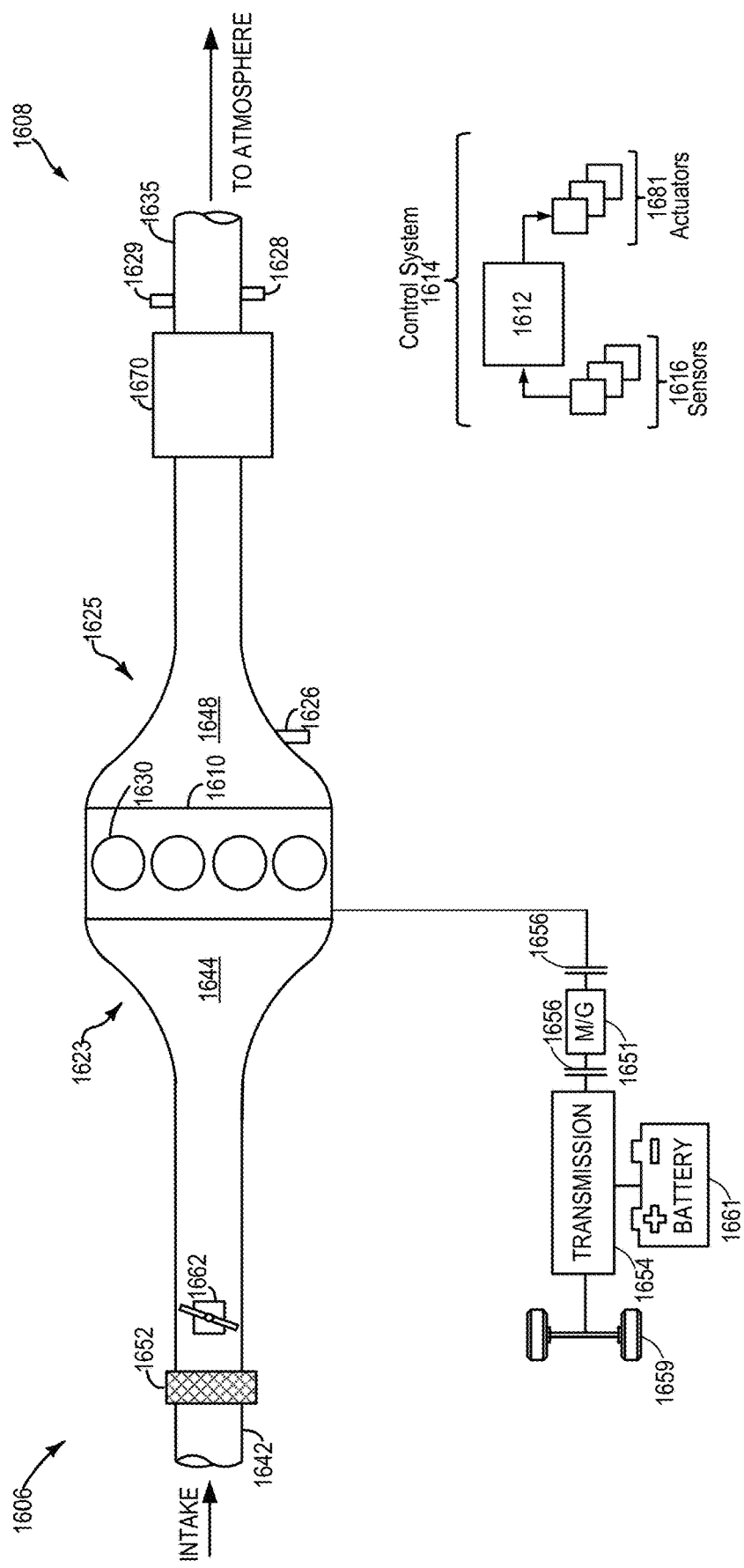
FIG. 16 shows an engine of a hybrid vehicle.

FIGS. 1A, 1B, 1C, and 1D illustrate a first embodiment of a housing comprising a combined reservoir and degas bottle. FIG. 2 illustrates a side-on, perspective view of a second embodiment of the housing, which may a non-limiting example of the first embodiment. FIG. 3 illustrates a top-down perspective view of the housing. FIG. 4 illustrates a bottom-up perspective view of the housing. FIG. 5 illustrates a perspective view from a second side of the housing. FIG. 6 illustrates a perspective view from a first side of the housing. FIG. 7 illustrates a further perspective view of the housing. FIG. 8 illustrates a cross-section of the housing taken along cross-sectional plane B-B of FIG. 2. FIG. 9 illustrates a direction of coolant flow in each of the first and second degas chambers. FIGS. 10 and 11 illustrate a direction of coolant flow in the first degas chamber and a direction of coolant flow in the second degas chamber, respectively. FIG. 12 illustrates a view of an interior volume of the housing from the first side of the housing. FIG. 13 illustrates an alternative embodiment of the transverse wall relative to the embodiment shown in FIG. 3. FIGS. 14 and 15 illustrate exploded views of two separate manufacturing methods of the combined reservoir and degas bottle. FIG. 16 illustrates a hybrid vehicle comprising an engine, wherein components of the hybrid vehicle may be arranged along the first or second coolant circuits fluidly coupled to the combined reservoir and degas bottle.

With particular reference to FIGS. 1A to 1D, there is shown a motor vehicle 1 having a cooling system 5 including first and second cooling circuits 15, 25 that operate with the same coolant but at different operating temperatures.

In the case of this example, the first cooling circuit 15 includes a first heat source in the form of an electronic power controller 10 such as an inverter controller and the second cooling circuit 25 includes a second heat source in the form of a high voltage battery 20. It will however be appreciated that the disclosure is not limited to such heat sources or to there being only one heat source in each cooling circuit. For example, the first and/or second circuits 15, 25, respectively, may be configured to flow coolant to an engine, a transmission, an electric motor, a turbocharger, an EGR cooler, a waste heat recovery device, and other heat exchangers.

Figure 1D:
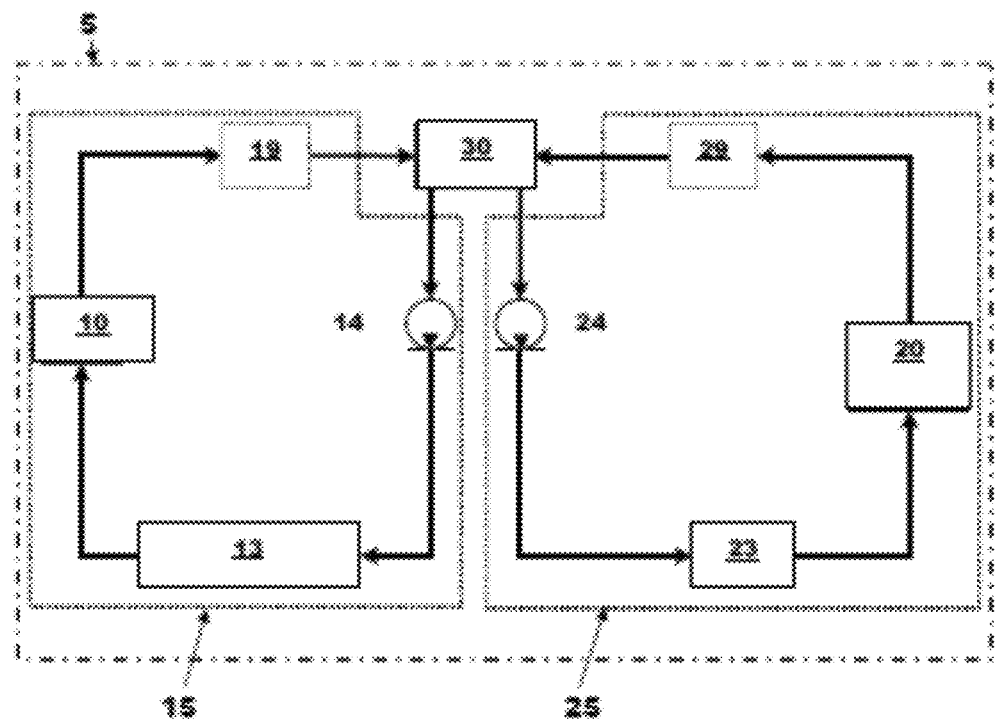
FIG. 1D shows a schematic diagram showing in more detail two cooling circuits forming part of the cooling system

For example, in FIG. 1D, the first cooling circuit 15 is shown having a secondary heat source in the form of a DC/DC converter 19 (Direct Current to Direct Current Converter 19) and the second cooling circuit 25 is shown having a secondary heat source in the form of an AC battery charger 29 (Alternating Current Battery Charger 29) for the high voltage battery 20.

It will be further appreciated that there could be more than two cooling circuits present in the cooling system 5 utilizing a common combined reservoir and degas bottle. To accommodate an increased number of cooling circuits, the number of degas chambers may be increased by introducing an increased number of dividing walls to separate the chambers, as will be described in greater detail below.

In the case of the example of FIGS. 1A and 1D, the first cooling circuit 15 comprises the power controller 10, the DC/DC converter 19, a circulation pump 14 and a heat exchanger in the form of a liquid to air radiator 13. The second cooling circuit 25 comprises the HV battery 20, the AC battery charger 29, a circulation pump 24 and a heat exchanger in the form of a liquid to liquid battery chiller 23 for the high voltage battery 20.

The first and second cooling circuits 15 and 25 both utilize a common combined reservoir and degas bottle 30 which forms a part of the cooling system 5 in order to deaerate the coolant flowing therethrough and in order to be filled and subsequently topped up with coolant via a single filler.

Operation of the first and second cooling circuits 15 and 25 comprises coolant being circulated through the common combined reservoir and degas bottle 30 and the components of the respective cooling circuit 15, 25 by the respective circulation pump 14, 24.

The single combined reservoir and degas bottle 30 is used to serve both of the cooling circuits 15, 25 whereas previously examples include a separate combined reservoir and degas bottle would be used for each cooling circuit 15, 25.

Referring now to FIGS. 1A, 1B, and 1C, the combined reservoir and degas bottle 30 comprises a body 31 made from a plastic material defining therein a reservoir chamber 32 and two degas chambers 34, 36. The reservoir chamber 32 is positioned above the two degas chambers 34, 36 and is separated therefrom by a transverse wall 33 that includes transfer apertures 37 to allow top-up coolant to pass in use from the reservoir chamber 32 to the degas chambers 34, 36 and any extracted gas to flow from the degas chambers 34, 36 to the reservoir chamber 32.

It will be appreciated that in the case of this example the transverse wall 33 is a single component extending across both of the degas chambers 34, 36. However it will be appreciated that the transverse wall could alternatively be formed by two separate components, one for each degas chamber 34, 36.

It will be further appreciated that instead of a single transfer aperture for each degas chamber 34, 36 there could be a plurality of small transfer apertures in the transverse wall communicating with each degas chamber 34, 36.

The size and location of the transfer apertures 37 may be selected to minimize the probability of liquid transfer in use between the two degas chambers 34, 36 via the reservoir chamber 32.

In this way, the reservoir chamber 32 is a single chamber arranged vertically above the degas chambers 34, 36 with respect to a direction of gravity 99. As mentioned above, the number of degas chambers may be equal to the number of coolant circuits. Thus, if there are five distinct coolant circuits then the combination reservoir and degas bottle 30 may comprise five degas chambers, each chamber corresponding to one of the coolant circuits. However, a single transverse wall 33 may extend across the five degas chambers, thereby shaping a single reservoir chamber 32 there above. By going this, the combination reservoir and degas bottle 30 may comprise a single reservoir chamber and a single transverse wall independent of a number of degas chambers.

Each of the degas chambers 34, 36 has respective inlet and outlet connections 41, 42; 51, 52 for connecting the respective degas chamber 34, 36 to a respective one of the separate cooling circuits 15, 25. More specifically, the degas chamber 34 may be a first degas chamber 34 comprising a first inlet 41 and a first outlet 42. The degas chamber 36 may be a second degas chamber 36 comprising a second inlet 51 and a second outlet 52. The first inlet 41 may be fluidly separated from the second inlet 51. Similarly, the second outlet 42 may be fluidly separated from the second outlet 52. As such, coolant from the first coolant circuit may not mix with coolant from the second coolant circuit.

The first degas chamber 34 is separated from the second degas chamber 36 via a dividing wall 35. In one example, the dividing wall 35 is a substantially vertical thermally insulating dividing wall 35. The dividing wall 35 fluidly isolates the two degas chambers 34, 36 from one another so that coolant is blocked from flowing therebetween and is constructed to provide a thermal barrier between the adjacent degas chambers 34, 36 by being made of a material having a low thermal conductivity such as a plastics material. Additionally or alternatively, the dividing wall 35 may comprise a double-wall shape, wherein a gap is arranged between the double-walls. The gap may be filled with air or a liquid that functions as an insulating barrier.

As shown in FIG. 1C, each transfer aperture 37 is positioned in the separation wall 32 towards an opposite end of the respective degas chamber 34, 36 with which it communicates from where coolant enters the respective degas chamber 34, 36 from the associated inlet connection 41, 51. This arrangement may reduce the probability of coolant mixing between the first degas chamber 34 and the second degas chamber 36.

In other embodiments, more than one dividing wall may be used between adjacent degas chambers 34, 36 in order to further improve the thermal barrier between adjacent degas chambers 34, 36, such as in the double wall embodiment described above. Additionally or alternatively, a wall thickness may be adjusted based on a difference between temperatures of adjacent degas chamber. For example, as the difference increases, then the wall thickness may increase to mitigate thermal communication therebetween.

In the example of FIG. 1B, the dividing wall 35 extends from a bottom surface 34b, 36b of the respective degas chamber 34, 36 to the transverse wall 33 separating it from the reservoir chamber 32. In this way, the dividing wall 35 does not contact a volume of the reservoir chamber 32. Furthermore, the transverse wall 33 is positioned so as to be located in use at a position below a minimum coolant fill level Cmin which in all cases is located in the reservoir chamber 32 of the combined reservoir and degas bottle 30.

As shown in FIG. 1B, the minimum coolant fill level Cmin is positioned at a height "H" above the bottom surface 36b of the second degas chamber 36 and the transverse wall 33 is positioned at a height "h" above the bottom surface 36b of the degas chamber 36. The height "h" is less than height "H". This arrangement ensures that the transverse wall 33 is below the level of the coolant in the reservoir chamber 32 so that both of the degas chambers 34, 36 can be topped up with coolant from a common source of coolant, namely the coolant residing in the reservoir chamber 32.

By doing this, the transverse wall 33 may promote efficient filling of the first and second degas chambers 34, 36 so that a desired volume within the chambers is realized. Furthermore, by sizing the dividing wall 35 to also remain below each of the minimum coolant fill level Cmin and the transverse wall 33, a cost of manufacture of the combination reservoir and degas bottle 30 may be reduced as the insulating material of the dividing wall 35 may be relatively expensive. As shown in the previous example, the dividing wall therein extends well above a maximum fill line of the degas chambers, as such, the system therein may suffer from inefficient filling of the separate chambers and an inability to maintain a desired volume in the chambers.

It will be appreciated that the reservoir chamber 32 includes a coolant fill element in the form of a filler tube 38 that communicates with the reservoir chamber 32 via an aperture 38a forming a top-up port for the combined reservoir and degas bottle 30. As is well known in the art, a pressure cap 38c (FIG. 1A) is engaged with the filler tube 38 to permit the cooling system 5 to be pressurized.

The first inlet connection 41 for the first degas chamber 34 is positioned above the first outlet connection 42 for the first degas chamber 34 so that coolant flows in use downwardly as it passes through the first degas chamber 34. This assists with deaeration of the coolant flowing through the first degas chamber 34 as the entrained gas will tend to migrate upwardly due to its lower density compared to the liquid coolant.

It will be appreciated that, if desired, one or more baffles or other flow disturbing features can be located in the path between the first inlet connection 41 and the first outlet connection 42 to assist with deaeration of the coolant.

Similarly, the second inlet connection 51 for the second degas chamber 36 is positioned above the second outlet connection 52 for the second degas chamber 36 so that coolant flows in use downwardly as it passes through the second degas chamber 36. As previously mentioned this downward flow assists with deaeration of the coolant passing through the degas chamber 36 as the entrained gas will tend to migrate upwardly due to its lower density compared to the liquid coolant.

As before, one or more baffles or other flow disturbing features can be located in the path between the second inlet connection 51 and the second outlet connection 52.

The first inlet connection 41 receives a flow of coolant from the first cooling circuit 15 via a first supply conduit 11 to which it is connected. The coolant is returned to the first cooling circuit 15 from the first outlet connection 42 of the first degas chamber 34 to a first return conduit 12 to which it is connected.

The second inlet connection 51 receives a flow of coolant from the second cooling circuit 25 via a second supply conduit 21 to which it is connected. The coolant is returned to the second cooling circuit 25 from the outlet connection 52 of the second degas chamber 36 to a second return conduit 22 to which it is connected.

It will be appreciated that the combined reservoir and degas bottle 30 is positioned above all of the other components in the cooling system 5 so that any entrained gas will be able to migrate to the reservoir chamber 32 of the combined reservoir and degas bottle 30.

Therefore in summary, the cooling system 5 has first and second separate cooling circuits 15, 25 each having a different operating temperature threshold. The first and second cooling circuits 15, 25 share a single combined reservoir and degas bottle 30 which has a single reservoir chamber 32 fluidly coupled to the first degas chamber 34, which is fluidly coupled to receive coolant from only the first cooling circuit 15 and the reservoir chamber 32. The second degas chamber 36 is fluidly coupled to receive coolant from only the second cooling circuit 25 and the reservoir chamber 32. As such, coolant from the first cooling circuit 15 and the second cooling circuit 25 may not mix. Coolant in the first degas chamber 34 may not directly mix with coolant in the second degas chamber 36. In one example, coolant from the first and second degas chambers 34, 36 may mix only in the reservoir chamber 32, which is unlikely due to the downward flow of coolant described above.

As previously referred to, the first degas chamber 34 is connected to the first cooling circuit 15 and the second degas chamber 36 is connected to the second cooling circuit 25.

In the case of the example provided, the first cooling circuit 15 demands coolant to be circulated at a temperature of less than or equal to 70° C. The second cooling circuit 25 demands coolant to be circulated at a temperature of less than or equal to 40° C. By thermally insulating the first and second degas chambers 34 and 36 from one another by using a thermal barrier therebetween and minimizing the flow of coolant through the reservoir chamber 32, the combination reservoir and degas bottle 30 enables the use of a single combined reservoir and degas bottle 30 to be used for both of the cooling circuits 15, 25.

Some advantages of such an arrangement are improved system deaeration, reduced cost because of a reduced need for additional coolant manifolds, reduced packaging space needed within a vehicle, reduced manufacturing costs, and reduced service time due to the use of a single fill point. The reduced cost and packaging size may be further attributed to the height of the dividing wall being below the minimum fill line Cmin of the combined reservoir and degas bottle 30.

Referring now to FIGS. 2 to 13, there is shown a second embodiment, alternative to the first embodiment illustrated in FIGS. 1A-1D, of an exemplary combined reservoir and degas bottle in accordance with the disclosure.

The combined reservoir and degas bottle 130 comprises a plastic molded shell in the form of a body 131 defining therein an upper reservoir chamber 132 and first and second degas chambers 134, 136. The reservoir chamber 132 is located above both of the degas chambers 134, 136 and extends across the full width of the body 131. In one example, the combined reservoir and degas bottle 130 is a non-limiting example of the combined reservoir and degas bottle 30 of FIGS. 1A-1D.

The reservoir chamber 132 is separated from both of the degas chambers 134, 136 by a single transverse wall 133 that extends along the full length of the body 131. The transverse wall 133 includes, in the case of the example of FIG. 8, two transfer apertures 137 to allow top-up coolant to pass in use from the reservoir chamber 132 to the degas chambers 134, 136 and extracted gas to flow upwardly from the degas chambers 134, 136 to the reservoir chamber 132. In the case of this example, there is one transfer aperture 137 in fluid communication with the first degas chamber 134 and one transfer aperture 137 in fluid communication with the second degas chamber 136. As such, coolant flows from the reservoir chamber 132 to the first degas chamber 134 via a first transfer aperture of the transfer apertures 137, further comprising where gas flows from the first degas chamber 134 to the reservoir chamber 132 via the first transfer aperture. Coolant flows from the reservoir chamber to the second degas chamber 136 via a second transfer aperture of the transfer apertures 137 different than the first transfer aperture. Gas from the second degas chamber 136 flows to the reservoir chamber 132 via the second transfer aperture. As such, gases from the first and second degas chamber 134, 136 may mix in the reservoir chamber 132.

It will however be appreciated that a plurality of transfer apertures may be arranged in the transverse wall 133. As shown in the example of FIG. 13, which is the same view as FIG. 8, the two transfer apertures 137 of FIG. 8 have been replaced by a plurality of small apertures 137a arranged in the case of this example as a mesh. The term "small apertures" in the case of this disclosure are apertures of 1 to 3 mm transverse dimension (diameter; width, length). In one example, the plurality of small apertures 137a are smaller in size than the apertures 137 of FIG. 8. In the example of FIG. 13, the plurality of small apertures 137a comprise at least three or more apertures.

The size and location of each transfer aperture 137 and the arrangement of small apertures 137a, if used, are chosen so as to minimize the probability of liquid transfer in use between the two degas chambers 134, 136. As such, in one example, the apertures 137 or the plurality of smaller apertures 137a are arranged in a location distal to the dividing wall 135 to block mixing of coolant between the first and second degas chambers 134, 136.

The first degas chamber 134 comprises a first inlet connection 111 and a first outlet connection 110 for connecting the degas chamber 134 to a respective cooling circuit such as the cooling circuit 15 shown in FIGS. 1A and 1D. As shown, the first inlet connection 111 is arranged at an opposite side of the combined reservoir and degas bottle 130 relative to a longitudinal axis 199 of the combined reservoir and degas bottle 130.

The second degas chamber 136 comprises a second inlet connection 121 and a second outlet connection 120 for connecting the respective degas chamber 136 to a respective cooling circuit such as the cooling circuit 25 shown in FIGS. 1A and 1D. As shown, the second inlet connection 111 is arranged at an opposite side of the combined reservoir and degas bottle 130 relative to the longitudinal axis 199. Additionally, the second inlet connection 121 is arranged opposite and offset to the first inlet connection 111 such that longitudinal axes extending through the inlets are parallel. Similarly, the second outlet connection 120 is arranged opposite and offset to the second outlet connection 110 such that longitudinal axes extending through the outlets are parallel.

More specifically, as shown in FIG. 8, the first inlet connection 111 and the second outlet connection 120 are arranged at a first side 834 of the combined reservoir and degas bottle 130. The first outlet connection 110 and the second inlet connection 121 are arranged at a second side 836 of the combined reservoir and degas bottle 130. The first side 834 and the second side 836 are arranged opposite one another relative to the longitudinal axis 199. As such, coolant in the first and second degas chambers 134, 136 flow an entire longitudinal length of the combined reservoir and degas bottle 130 prior to reentering the first and second coolant circuits, respectively.

The first degas chamber 134 is separated from the adjacent second degas chamber 136 by a dividing wall 135, shown in FIGS. 5, 6, and 12. The dividing wall 135 fluidly isolates the two degas chambers 134, 136 from one another so that coolant cannot flow therebetween and is constructed to provide a thermal barrier between the adjacent degas chambers 134, 136 by comprising a material having a low thermal conductivity such as a plastic material from which the body 131 is constructed. Additionally or alternatively, the dividing wall 135 may comprise one or more of a polymer, ceramic, and the like. Additionally or alternatively, the dividing wall 135 may be hollow and comprise an interior volume comprising an insulating element such as a vacuum, gas, liquid, or the like.

In one example, the dividing wall 135 separating the first degas chamber 134 from the second degas chamber 136 is a double wall having an air-gap between the two walls and, in the case of this example, the dividing wall separating the first degas chamber 134 from the second degas chamber 136 is a V-shaped double wall 135 shown in FIG. 12. As such, the walls of the dividing wall 135 may be acutely angled relative to one another, wherein the walls are coupled to one another at one extreme end while being coupled to the body 131 at an opposite extreme end. It will be appreciated that the dividing wall may comprise another shape or configuration and that the present disclosure is not limited to the use of a V-shaped double wall.

The dividing wall 135 has a first limb 135a in contact with coolant in the first degas chamber 134 and a second limb 135b in contact with coolant in the second degas chamber 136. Between the two limbs 135a, 135b there is defined a V-shaped air gap 135c which further increases the thermal barrier, thereby decreasing thermal communication, between the two degas chambers 134, 136. The first and second limbs 135a and 135b are oriented at an angle relative to the transverse wall 135, wherein an intersection of the limbs occurs in-line with a central axis of the combined reservoir and degas bottle 130 (e.g., central axis 1299 of FIG. 12).

In the case of the example shown, each transfer aperture 137 is positioned in the transverse wall 133 towards an opposite end of the degas chamber 134, 136 with which it communicates from where coolant enters the respective degas chamber 134, 136 from a respective inlet connection 111, 121. This reduces the probability of coolant flowing through the reservoir chamber 132 from the first degas chamber 134 to the second degas chamber 136 or vice versa.

Said another way, a first transfer aperture fluidly coupling the reservoir chamber 132 to the first degas chamber 134 is arranged longitudinally opposite to the first inlet connection 111 relative to the longitudinal axis 199. A second transfer aperture fluidly coupling the reservoir chamber 132 to the second degas chamber 136 is arranged longitudinally opposite to the second inlet connection 121 relative to the longitudinal axis 199. By arranging the transfer apertures 137 in this way, the likelihood of coolant mixing may be reduced.

The dividing wall 135 extends from a bottom surface of the first and second degas chambers 134, 136 to the transverse wall 133 separating it from the reservoir chamber 132 and is substantially vertically arranged. In one example, the dividing wall 135 is arranged in an orientation perpendicular to the transverse wall 133. Additionally or alternatively, the dividing wall 135 may be arranged along a central axis 1299 of the combined reservoir and degas bottle 130 such that the first degas chamber 134 and the second degas chamber 136 are equal in volume. It will be appreciated that the dividing wall 135 may be offset to the central axis 1299 to allow the degas chambers to be sized differently to accommodate cooling demands.

The height of the dividing wall 135 is set below the minimum fill line because if it is too high (e.g., at or above the minimum fill line) it will hamper efficient filling of the separate degas chambers 134, 136 and once filled, the coolant reservoir formed by the reservoir chamber 132 may not be able to maintain the desired coolant volume of each of the cooling circuits connected to the combined reservoir and degas bottle 130. That is to say, a pressure of coolant in the separate degas chambers may be too high if the height of the dividing wall is greater than a desired height. It is therefore important for the height of the dividing wall 135 to be below a minimum coolant fill position of the combined reservoir and degas bottle 130.

If the height of the dividing wall 135 is too low, then too much coolant mixing will occur and excessive heat transfer will occur between the adjacent degas chambers 134, 136. This can cause components in the cooler running cooling circuit to overheat, reduce their efficiency or demand additional energy to be used to cool these components.

Therefore, in order to minimize the negative effects of the dividing wall being too low whilst still preventing undesirable heat transfer, a horizontal baffle in the form of the transverse wall 133 is provided that extends across the top of the dividing wall 135 and the two degas chambers 134, 136.

It will be appreciated that the reservoir chamber 132 includes a coolant fill element in the form of a filler tube 138 that communicates with the reservoir chamber 132 via an aperture 138a (See FIG. 3) forming a top-up port for the bottle 130. As is well known in the art, a pressure cap (not shown) is engageable with the filler tube 138 in use to permit a cooling system of which the combined reservoir and degas bottle forms a part to be pressurized.

The first inlet connection 111 for the first degas chamber 134 is positioned above the first outlet connection 110 for the first degas chamber 134 so that coolant flows in downwardly as it passes through the first degas chamber 134. This arrangement assists with deaeration of the coolant flowing through the first degas chamber 134 as any entrained gas will tend to migrate upwardly due to its lower density compared to the liquid coolant.

Similarly, the second inlet connection 121 for the second degas chamber 136 is positioned above the second outlet connection 120 for the second degas chamber 136 so that coolant flows in use downwardly as it passes through the second degas chamber 136. As previously mentioned, this downward flow assists with deaeration of any coolant passing through the second degas chamber 136.

The inlet connection 111 receives a flow of coolant from a first cooling circuit such as the cooling circuit 15 via a supply conduit which is connected to the inlet connection 111. The coolant is returned to the first cooling circuit from the outlet connection 110 of the first degas chamber 134 by a return conduit which is connected to the outlet connection 110 of the first degas chamber 134.

The second inlet connection 121 receives a flow of coolant from a second cooling circuit such as the cooling circuit 25 via a supply conduit which is connected to the second inlet connection 121. The coolant is returned to the second cooling circuit from the second outlet connection 120 of the second degas chamber 136 by a return conduit which is connected to the outlet connection 120 of the second degas chamber 136.

It will be appreciated that the combined reservoir and degas bottle 130 is positioned above all of the other components in the cooling circuits that it is connected to so that any entrained gas will be able to migrate to the reservoir chamber 132 of the combined reservoir and degas bottle 130, relative to a direction of gravity.

The first and second degas chambers 134 and 136 are arranged in a side by side relationship below the reservoir chamber 132. In use, coolant will flow in the first degas chamber 134 from a first end of the combined reservoir and degas bottle 130 to a second end of the combined reservoir and degas bottle 130 in the direction of arrow "F1" shown in FIGS. 9 and 10 and will flow in the second degas chamber 136 from the second end of the combined reservoir and degas bottle 130 to the first end of the combined reservoir and degas bottle 130 in the direction of the arrow "F2" shown in FIGS. 9 and 11.

In this way, coolant enters the first degas chamber 134 at a first height below the transverse wall 132, and flows down and along the longitudinal axis 199 from the first inlet connection 111 to the first outlet connection 110. Furthermore, coolant enters the second degas chamber 136 via the second inlet connection 121 at the first height, wherein the coolant flows down and along the longitudinal axis 199 toward the second outlet connection 120.

The inlet connections 111, 121 for the first and second degas chambers 134 and 136 respectively are formed in end walls of the respective degas chambers 134, 136 defined by the body 131 and the outlet connections 110, 120 for the first and second degas chambers 134 and 136 respectively are formed in base or bottom walls of the respective degas chambers 134, 136 defined by the body 131.

Therefore, in summary, the combined reservoir and degas bottle 130 has a reservoir chamber 132 and first and second degas chambers 134 and 136, one degas chamber 134, 136 for each of two cooling circuits. The two cooling circuits using the same coolant but operate at a significantly different operating temperature.

In one example, the embodiment illustrated in the examples of FIGS. 2-13 comprising a first chamber and a second chamber arranged within a single housing. The housing may further comprise a reservoir arranged vertically above the first and second chambers.

The first chamber may be fluidly coupled to a first coolant circuit via a first inlet and a first outlet. The first inlet may be arranged on a first side of the housing and the first outlet may be arranged on a second side of the housing. The first side may be opposite the second side relative to a longitudinal axis of the housing.

The second chamber may be fluidly coupled to a second coolant circuit via a second inlet and a second outlet. The second inlet may be arranged on the second side of the housing and the second outlet may be arranged on the first side of the housing. In this way, a direction of coolant flow through the first chamber may be opposite a direction of coolant flow through the second chamber.

The first inlet and the second inlet may be arranged vertically above the first outlet and the second outlet, respectively. By doing this, coolant may flow in a downward direction with gravity, which may promote deaeration. Gas from the coolant may flow through apertures of a transverse wall, which is otherwise configured to fluidly separate the first and second chambers from the reservoir. That is to say, other than the apertures, there are no other openings in the transverse wall for fluids or gases to pass from the first and second chambers to the reservoir or vice-versa.

A first aperture is arranged adjacent to the second side of the housing, wherein the first aperture fluidly couples the first chamber to the reservoir. A second aperture is arranged adjacent to the first side of the housing, wherein the second aperture couples the second chamber to the reservoir. Fluids and/or gases from the first chamber may not flow through the second aperture. Similarly, fluids and/or gases from the second chamber may not flow through the first aperture.

The transverse wall is arranged at a height less than a minimum fill line height of the reservoir. As such, the transverse wall is submerged in coolant during a plurality of operating conditions. In this way, as coolant flows through the first aperture to the first chamber, gases from the first chamber flow through the first aperture to the reservoir, wherein the gases may bubble through coolant in the reservoir before being released via a filler tube. Similarly, gases from the second chamber may flow through the second aperture to the reservoir, wherein the gases may bubble through the coolant in the reservoir before being released via the filler tube. In this way, gases from the first and second chambers may mix in the reservoir before being released via the filler tube, wherein the filler tube may be the outlet for the gases to escape the housing.

The first and second chambers may be fluidly separated via a dividing wall. The dividing wall may comprise one or more thermally insulating materials, such as plastic, ceramic, or the like. Additionally or alternatively, the dividing wall may comprise a double-wall shape, wherein a first wall and a second wall of the dividing wall may be separated via a gap. The gap may be filled with air, liquid, or both to thermally separate the first chamber from the second chamber. In this way, if a first coolant circuit with a first coolant temperature is fluidly coupled to the first chamber, then coolant from a second coolant circuit with a second coolant temperature fluidly coupled to the second chamber may not adjust a temperature of coolant of the first coolant circuit. In this way, efficient operation of components arranged along the first and second coolant circuits is maintained while the coolant circuits share a combined reservoir and degas bottle in the housing.

The dividing wall may comprise a height such that it extends from a lowest portion of the housing up to the transverse wall. In this way, the dividing wall may not extend into the reservoir. A length of the dividing wall, measured along the longitudinal axis of the housing, corresponds to a distance between the first and second sides of the housing. In this way, the dividing wall is physically coupled to each of the lowest portion of the housing, the first side, the second side, and the transverse wall. In one example, the housing, including the transverse wall and the dividing wall is symmetric about its longitudinal axis.

In some examples, additionally or alternatively, the dividing wall may extend beyond the transverse wall. In one example, the dividing wall extends up to the minimum fill line of the reservoir. In another example, additionally or alternatively, the dividing wall extends to a position between the minimum fill line and a maximum fill line of the reservoir. In a further example, additionally or alternatively, the dividing wall extends up to the maximum fill line of the reservoir.

The term 'significantly different operating temperature' as meant herein is a difference in temperature that is large enough that components forming part of one of the two cooling circuits cannot operate successfully or reliably if operated at the temperature of the other cooling circuit.

Some advantages of such an arrangement are improved system deaeration, reduced cost because of a reduced need for additional coolant manifolds, reduced packaging space desired within a vehicle, reduced manufacturing costs and reduced service time due to the use of a single fill point.

Although the disclosure has been described with reference to an embodiment having two degas chambers for two cooling circuits it will be appreciated that the disclosure is equally applicable to a combined reservoir and degas bottle having more than two degas chambers. In such an example, a number of dividing walls may be increased. In one example, a number of dividing walls is equal to a number of degas chambers minus one. However, regardless of the number of degas chambers, there may only be one transverse wall present. Additionally or alternatively, the number of transverse walls may be increased wherein each degas chamber may comprise one transverse wall. Additionally or alternatively, a pair of degas chambers may share a transverse wall.

For example, there could be three or four cooling circuits utilizing the same coolant but requiring to be operated at differing temperatures. In such a case the combined reservoir and degas bottle would have a like number of degas chambers as there are cooling circuits and a single reservoir located above and fluidly connected to all of the degas chambers so as to permit all of the cooling circuits to be filled and topped up with coolant via a single fill point formed as part of the reservoir. As with the previously described embodiments the degas chambers would in such an arrangement be thermally insulated from one another and the probability of cross-flow between the degas chambers via the common reservoir would be controlled in the manner previously discussed.

With reference to FIG. 14, there is shown an exploded view of the combined reservoir and degas bottle 130 shown in FIGS. 2 to 13.

The combined reservoir and degas bottle 130 is formed in two halves there being an upper body part 131T and a lower body part 131U. The transverse wall 133 is formed as a single plate of plastics material.

The upper body part 131U defines the sides and upper surface of the reservoir chamber 132 (not visible in FIG. 14) and the filler tube 138 and is molded as a single component.

The upper body part 131U of the combined reservoir and degas bottle 130 defines the sides and lower surfaces of the first and second degas chambers 134 and 136 (not visible in FIG. 14) and the inlet and outlet connections 111, 121 and 110, 120 for the first and second degas chambers 134 and 136 and is molded as a single plastic component.

The transverse wall 133 forms a floor for the reservoir chamber 132 and ceilings or top covers for the first and second degas chambers 134 and 136 when the combined reservoir and degas bottle 130 is fully assembled.

The method comprises molding from plastics material the upper and lower body parts 131T and 131U, welding the transverse wall to the upper body part 131T as indicated by the arrows s1 and then welding the sub-assembly of the upper body part 131T and transverse wall 133 to the lower body part 131U as indicated by the arrows s2.

Alternatively, the method comprises molding from plastics material the upper and lower body parts 131T and 131U, welding the transverse wall 133 to the lower body part 131U and then welding the sub-assembly of the lower body part 131U and transverse wall 133 to the upper body part 131T.

With reference to FIG. 15 there is shown an alternative exploded view for producing a second embodiment of a combined reservoir and degas bottle that is intended to be a direct replacement for the combined reservoir and degas bottle 130 shown in FIGS. 2 to 13.

The construction of this second embodiment is similar to that previously described and so will not be described again in detail.

The combined reservoir and degas bottle 230 is formed in two halves there being a left body part 231L and a right body part 231R. In one example, the example of FIG. 15 differs from the example of FIG. 14 in that the example of FIG. 15 illustrates the combined reservoir and degas bottle 230 being divided along a lateral axis 1599, whereas the combined reservoir and degas bottle 130 of FIG. 14 is divided along the central axis 1299 parallel to the longitudinal axis 199.

A transverse wall is molded in two parts, one part 233L as part of the left body part 231L and another part 233R as part of the right body part 231R.

The left body part 231L defines the sides and upper surface of a left hand end of a reservoir chamber 132 visible in FIG. 15), the sides and lower surfaces of left ends of the first and second degas chambers (not visible in FIG. 15), an outlet connection 210 for the first degas chamber and an inlet connection 221 for the second degas chamber and the left hand part 233L of the transverse wall 133 all of the parts being molded as a single plastic component.

The right body part 231R defines the sides and upper surface of a right hand end of the reservoir chamber (not visible in FIG. 15), the sides and lower surfaces of right ends of the first and second degas chambers (not visible in FIG. 15), an outlet connection 220 for the second degas chamber and the inlet connection 211 for the first degas chamber, the right hand part 233R of the transverse wall and a filler tube 238, all of the parts being molded as a single plastic component.

The two parts 233L, 233R forming the transverse wall form a floor for the reservoir chamber and ceilings or top covers for the first and second degas chambers when the combined reservoir and degas bottle 230 is fully assembled.

A method of manufacture comprises molding from plastics material the left and right body parts 231L and 231R, and then welding the left body part 231L to the right body part 231R as indicated by the arrow "W" on FIG. 15.

FIG. 16 shows a schematic depiction of a hybrid vehicle system 1606 that can derive propulsion power from engine system 1608 and/or an on-board energy storage device. An energy conversion device, such as a generator, may be operated to absorb energy from vehicle motion and/or engine operation, and then convert the absorbed energy to an energy form suitable for storage by the energy storage device.

Engine system 1608 may include an engine 1610 having a plurality of cylinders 1630. Engine 1610 includes an engine intake 1623 and an engine exhaust 1625. Engine intake 1623 includes an air intake throttle 1662 fluidly coupled to the engine intake manifold 1644 via an intake passage 1642. Air may enter intake passage 1642 via air filter 1652. Engine exhaust 1625 includes an exhaust manifold 1648 leading to an exhaust passage 1635 that routes exhaust gas to the atmosphere. Engine exhaust 1625 may include one or more emission control devices 1670 mounted in a close-coupled position or in a far underbody position. The one or more emission control devices may include a three-way catalyst, lean NOx trap, diesel particulate filter, oxidation catalyst, etc. It will be appreciated that other components may be included in the engine such as a variety of valves and sensors, as further elaborated in herein. In some embodiments, wherein engine system 1608 is a boosted engine system, the engine system may further include a boosting device, such as a turbocharger.

Vehicle system 1606 may further include control system 1614. Control system 1614 is shown receiving information from a plurality of sensors 1616 (various examples of which are described herein) and sending control signals to a plurality of actuators 1681 (various examples of which are described herein). As one example, sensors 1616 may include exhaust gas sensor 1626 located upstream of the emission control device, temperature sensor 1628, and pressure sensor 1629. Other sensors such as additional pressure, temperature, air/fuel ratio, and composition sensors may be coupled to various locations in the vehicle system 1606. As another example, the actuators may include the throttle 1662.

Controller 1612 may be configured as a conventional microcomputer including a microprocessor unit, input/output ports, read-only memory, random access memory, keep alive memory, a controller area network (CAN) bus, etc. Controller 1612 may be configured as a powertrain control module (PCM). The controller may be shifted between sleep and wake-up modes for additional energy efficiency. The controller may receive input data from the various sensors, process the input data, and trigger the actuators in response to the processed input data based on instruction or code programmed therein corresponding to one or more routines.

In some examples, hybrid vehicle 1606 comprises multiple sources of torque available to one or more vehicle wheels 1659. In other examples, vehicle 1606 is a conventional vehicle with only an engine, or an electric vehicle with only electric machine(s). In the example shown, vehicle 1606 includes engine 1610 and an electric machine 1651. Electric machine 1651 may be a motor or a motor/generator. A crankshaft of engine 1610 and electric machine 1651 may be connected via a transmission 1654 to vehicle wheels 1659 when one or more clutches 1656 are engaged. In the depicted example, a first clutch 1656 is provided between a crankshaft and the electric machine 1651, and a second clutch 1656 is provided between electric machine 1651 and transmission 1654. Controller 1612 may send a signal to an actuator of each clutch 1656 to engage or disengage the clutch, so as to connect or disconnect crankshaft from electric machine 1651 and the components connected thereto, and/or connect or disconnect electric machine 1651 from transmission 1654 and the components connected thereto. Transmission 1654 may be a gearbox, a planetary gear system, or another type of transmission. The powertrain may be configured in various manners including as a parallel, a series, or a series-parallel hybrid vehicle.

Electric machine 1651 receives electrical power from a traction battery 1661 to provide torque to vehicle wheels 1659. Electric machine 1651 may also be operated as a generator to provide electrical power to charge battery 1661, for example during a braking operation.

In one example, the electric machine 1651, the engine 1610, and other components of the vehicle system 1606 may be arranged along a first coolant circuit, such as the first coolant circuit 15 of FIG. 1, and a second coolant circuit, such as the second coolant circuit 25 of FIG. 1. In one example, hotter components may be arranged along the first coolant circuit and cooler components may be arranged along the second coolant circuit.

Although the disclosure has been described with respect to use for cooling circuits in which the components forming heat sources to be cooled are of an electrical or electronic nature such as, a high voltage battery; an alternating current high voltage battery charger; a direct current to direct current converter and a high power electronic controller it will be appreciated that it is not limited to use with such components and the heat source requiring liquid cooling could for example and without limitation be an internal combustion engine, a transmission component, an air compressor forming part of a supercharger or turbocharger or any other suitable component requiring liquid cooling.

In this way, a degas bottle and a coolant reservoir may be combined to while allowing efficient deaeration of coolant therein. Furthermore, walls of the combined reservoir and degas bottle may be sized to promote efficient fill-up of each of the chambers arranged therein. The technical effect of sizing the walls with a height less than a minimum fill line height of the combined reservoir and degas bottle is to mitigate coolant mixing between separate chambers while allowing coolant to flow into the chambers from the reservoir and from inlets coupled thereto.

FIGS. 1-16 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. It will be appreciated that one or more components referred to as being "substantially similar and/or identical" differ from one another according to manufacturing tolerances (e.g., within 1-5% deviation).

In another representation, the combined reservoir and degas bottle is fluidly coupled to coolant circuits of a hybrid vehicle.

An embodiment of a combined reservoir and degas bottle for receiving liquid coolant from two or more separate cooling circuits each having a different operating temperature threshold, the combined reservoir and degas bottle having an upper reservoir chamber including a single filler to permit the reservoir chamber to be filled with liquid coolant and a like number of separate degas chambers as there are separate cooling circuits wherein each of the degas chambers has respective inlet and outlet connections for connecting the degas chamber to a respective one of the separate cooling circuits, is separated from an adjacent degas chamber by a dividing wall forming a thermal barrier therebetween and is separated from the reservoir chamber by a transverse wall having at least one transfer aperture in communication with the respective degas chamber to allow top-up coolant to pass in use from the reservoir chamber to the respective degas chamber and any extracted gas to flow from the degas chamber to the reservoir chamber.

A first example of the bottle comprises where a body defining the upper reservoir chamber and the like number of degas chambers as there are separate cooling circuits.

A second example of the bottle, optionally including the first example, further comprises where the dividing wall extends from a bottom of the respective degas chamber to the transverse wall separating it from the reservoir chamber.

A third example of the bottle, optionally including one or more of the previous examples, further comprises where the transverse wall is positioned so as to be located in use at a position below a minimum coolant fill level of the bottle.

A fourth example of the bottle, optionally including one or more of the previous examples, further comprises where the inlet connection for each degas chamber is positioned above the outlet connection of that degas chamber so that coolant flows in use downwardly as it passes through the degas chamber.

A fifth example of the bottle, optionally including one or more of the previous examples, further comprises where there are two single transfer apertures in the transverse wall each being positioned towards an opposite end of the respective degas chamber with which it communicates to where coolant enters the respective degas chamber from the respective inlet connection of that degas chamber.

A sixth example of the bottle, optionally including one or more of the previous examples, further comprises where there are a plurality of small transfer apertures having a transverse dimension of 1 to 3 mm in the or each transverse wall communicating with each degas chamber.

A seventh example of the bottle, optionally including one or more of the previous examples, further comprises where there is a single transverse wall separating all of the degas chambers from the reservoir chamber.

An eighth example of the bottle, optionally including one or more of the previous examples, further comprises where there are first and second degas chambers arranged in a side by side relationship below the reservoir chamber.

A ninth example of the bottle, optionally including one or more of the previous examples, further comprises where the first degas chamber is connected in use to a first cooling circuit and the second degas chamber is connected in use to a second cooling circuit.

A tenth example of the bottle, optionally including one or more of the previous examples, further comprises where the dividing wall separating the first degas chamber from the second degas chamber is a double wall having a first limb in contact in use with coolant in the first degas chamber and a second limb in contact in use with coolant in the second degas chamber.

An eleventh example of the bottle, optionally including one or more of the previous examples, further comprises where coolant flows in use from a first end of the bottle to a second end of the bottle in the first degas chamber and from the second end of the bottle to the first end of the bottle in the second degas chamber.

An embodiment of a cooling system comprising two or more separate cooling circuits each having a different operating temperature threshold and a combined reservoir and degas bottle of the previous examples.

A first example of the cooling system further comprises where the system has a first cooling circuit and a second cooling circuit, the bottle has first and second degas chambers the first degas chamber is connected to the first cooling circuit and the second degas chamber is connected to the second cooling circuit.

A second example of the cooling system, optionally including the first example, further comprises where the first and second degas chambers are arranged in a side by side relationship in the bottle below the reservoir chamber.

A third example of the cooling system, optionally including one or more of the previous examples, further comprises where the first cooling circuit has one or more heat sources requiring liquid cooling and the second cooling circuit has one or more heat sources requiring liquid cooling.

A fourth example of the cooling system, optionally including one or more of the previous examples, further comprises where the first cooling circuit has a heat exchanger to dissipate heat from the coolant flowing through the first cooling circuit and a circulation pump to circulate the coolant through the first cooling circuit and the second cooling circuit has a heat exchanger to dissipate heat from the coolant flowing through the first second cooling circuit and a circulation pump to circulate the coolant through the second cooling circuit.

An embodiment of a system comprises a reservoir arranged vertically above a first chamber and a second chamber within a single housing, wherein a dividing wall fluidly seals the first chamber from the second chamber, and a transverse wall arranged below a minimum fill line of the housing, the transverse wall comprising apertures configured to flow coolant from the reservoir to the first and second chambers.

A first example of the system further comprises where a first inlet and a first outlet are fluidly coupled to the first chamber, wherein a second inlet and a second outlet are fluidly coupled to the second chamber, wherein the first inlet and the second outlet are arranged at a first side of the single housing and the first outlet and the second inlet are arranged at a second side of the single housing opposite the first side relative to a longitudinal axis of the single housing.

A second example of the system, optionally including the first example, further comprises where the first inlet is arranged vertically the first outlet and the second inlet is arranged vertically above the second outlet.

A third example of the system, optionally including one or more of the previous examples, further comprises where the dividing wall is physically coupled to the transverse wall and arranged below the minimum fill line.

A fourth example of the system, optionally including one or more of the previous examples, further comprises where the first chamber is fluidly coupled to a first coolant circuit and the second chamber is fluidly coupled to a second coolant circuit, wherein the first coolant circuit is fluidly separated from the second coolant circuit.

A fifth example of the system, optionally including one or more of the previous examples, further comprises where the transverse wall is a single wall separating the reservoir from the first chamber and the second chamber, wherein the apertures are the only openings in the transverse wall configured to allow coolant to flow from the reservoir to the first and second chambers.

A sixth example of the system, optionally including one or more of the previous examples, further comprises where the apertures comprise a first aperture configured to flow coolant from the reservoir to the first chamber and a second aperture configured to flow coolant from the reservoir to the second chamber, wherein the first and second aperture are arranged at opposite sides of the transverse wall relative to a longitudinal axis of the housing.

An embodiment of a cooling system, comprising a first coolant circuit fluidly coupled to a first degas chamber, a second coolant circuit fluidly coupled to a second degas chamber sealed from the first degas chamber, a housing comprising each of the first degas chamber and the second degas chamber and a reservoir arranged vertically above the first and second degas chambers, a transverse wall configured to fluidly separate the reservoir from the first degas chamber and the second degas chamber, the transverse wall arranged vertically below a minimum fill line of the housing, and a dividing wall physically coupled to the transverse wall, wherein the dividing wall fluidly and thermally separates the first and second degas chambers.

A first example of a cooling system further comprises where the dividing wall extends in a direction parallel to a longitudinal axis of the housing, wherein a cross-section of the dividing wall taken along a lateral axis of the housing comprises a V-shape, and wherein the dividing wall is angled relative to a plane of the transverse wall.

A second example of a cooling system, optionally including the first example, further comprises where a first degas chamber inlet is arranged proximally to a first side of the housing, and a first degas chamber outlet is arranged proximally to a second side of the housing, opposite the first side relative to a longitudinal axis of the housing, wherein the first degas chamber inlet is configured to flow coolant from the first coolant circuit to the first degas chamber and the first degas chamber outlet is configured to flow coolant from the first degas chamber to the first coolant circuit.

A third example of the cooling system, optionally including one or more of the previous examples, further comprises where the transverse wall comprises a first opening, proximal to the second side, configured to flow coolant from the reservoir to only the first degas chamber, the first opening is further configured to flow gas from the first degas chamber to the reservoir.

A fourth example of the cooling system, optionally including one or more of the previous examples, further comprises where a second degas chamber inlet is arranged proximally to the second side of the housing and a second degas chamber outlet is arranged proximally to the first side of the housing, wherein the second degas chamber inlet is configured to flow coolant from the second coolant circuit to the second degas chamber and the second degas chamber outlet is configured to flow coolant from the second degas chamber to the second coolant circuit.

A fifth example of the cooling system, optionally including one or more of the previous examples, further comprises where the transverse wall comprises a second opening, proximal to the first side, configured to flow coolant from the reservoir to only the second degas chamber, the first opening is further configured to flow gas from the second degas chamber to the reservoir.

A sixth example of the cooling system, optionally including one or more of the previous examples, further comprises where gas from the first degas chamber and gas from the second degas chamber exit the housing via a single outlet, wherein gas from the first degas chamber and gas from the second degas chamber mix in the reservoir prior to exiting the housing.

A seventh example of the cooling system, optionally including one or more of the previous examples, further comprises where the first opening is a first plurality of openings and the second opening is a second plurality of openings, wherein the first opening and the second opening are identical in size and shape.

An eighth example of the cooling system, optionally including one or more of the previous examples, further comprises where a volume of the first degas chamber is equal to a volume of the second degas chamber.

A ninth example of the cooling system, optionally including one or more of the previous examples, further comprises where a coolant temperature of coolant in the first coolant circuit is different than a coolant temperature of coolant in the second coolant circuit.

A tenth example of the cooling system, optionally including one or more of the previous examples, further comprises where coolant in the first coolant circuit does not mix with coolant in the second coolant circuit.

An embodiment of a hybrid vehicle comprising a first cooling circuit fluidly coupled to a first degas chamber arranged in a housing via a first inlet arranged at a first side of the housing and a first outlet arranged at a second side of the housing opposite the first side relative to a longitudinal axis of the housing, wherein the first outlet is arranged vertically below the first inlet, a second cooling circuit fluidly coupled to a second degas chamber arranged in the housing via a second inlet arranged at the second side and a second outlet arranged at the first side, wherein the second outlet is arranged vertically below the second inlet, a reservoir arranged vertically above the first degas chamber and the second degas chamber in the housing, the reservoir configured to maintain a desired volume of the first degas chamber and the second degas chamber, a transverse wall fluidly separating the reservoir from the first degas chamber and the second degas chamber, wherein a first aperture is arranged in the transverse wall and configured to fluidly couple the reservoir to the first degas chamber, wherein coolant flows in a direction of gravity from the reservoir to the first degas chamber and gas flow in a direction opposite gravity from the first degas chamber to the reservoir, further comprising a second aperture arranged in the transverse wall configured to fluidly couple the reservoir to the second degas chamber, wherein coolant flows in the direction of gravity from the reservoir to the second degas chamber and gas flow in the direction opposite gravity from the second degas chamber to the reservoir, and a dividing wall traversing an entire longitudinal length of the housing, the dividing wall physically coupled to each of the first side, the second side, and the transverse wall, wherein the dividing wall thermally and fluidly separates the first degas chamber from the second degas chamber.

A first example of the hybrid vehicle further comprises where the transverse wall is submerged in coolant and arranged below a minimum fill line of the housing.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A system, comprising:
a reservoir arranged vertically above a first chamber and a second chamber within a single housing, wherein a single dividing wall extends in a longitudinal direction and fluidly seals the first chamber from the second chamber, and a transverse wall arranged below a minimum fill line of the housing and submerged in coolant and physically coupled to a top of the dividing wall, wherein the minimum fill line is positioned at a height, H, above a bottom surface of the second chamber and the transverse wall is positioned at a height, h, above the bottom surface of the second chamber, wherein h<H, the transverse wall comprising apertures configured to flow coolant from the reservoir to the first and second chambers, and wherein a first inlet and a first outlet are fluidly coupled to the first chamber, wherein a second inlet and a second outlet are fluidly coupled to the second chamber, wherein the first inlet and the second outlet are arranged at a first side of the single housing and the first outlet and the second inlet are arranged at a second side of the single housing opposite the first side relative to a longitudinal axis of the single housing parallel to the longitudinal direction.

2. The system of claim 1, wherein the first inlet is arranged vertically above the first outlet and the second inlet is arranged vertically above the second outlet, wherein the first inlet and the second inlet are arranged vertically below the transverse wall, and wherein the first outlet is angled relative to the first inlet and the second outlet is angled relative to the second inlet.

3. The system of claim 1, wherein the first chamber is fluidly coupled to a first coolant circuit and the second chamber is fluidly coupled to a second coolant circuit, wherein the first coolant circuit is fluidly separated from the second coolant circuit outside of the housing, and wherein the dividing wall is insulated and comprises a V-shape, the dividing wall arranged in-line with a central axis of the reservoir.

4. The system of claim 1, wherein the transverse wall is a single wall separating the reservoir from the first chamber and the second chamber, wherein the apertures are the only openings in the transverse wall configured to allow coolant to flow from the reservoir to the first and second chambers.

5. The system of claim 1, wherein the apertures comprise a first aperture configured to flow coolant from the reservoir to only the first chamber and a second aperture configured to flow coolant from the reservoir to only the second chamber, wherein the first aperture and the second aperture are arranged at opposite sides of the transverse wall relative to a lateral axis of the housing.

6. A cooling system, comprising:
a first coolant circuit fluidly coupled to a first degas chamber;
a second coolant circuit fluidly coupled to a second degas chamber sealed from the first degas chamber;
a housing comprising each of the first degas chamber and the second degas chamber and a reservoir arranged vertically above the first and second degas chambers;
a transverse wall configured to fluidly separate the reservoir from the first degas chamber and the second degas chamber, the transverse wall arranged vertically below a minimum fill line of the housing and submerged in coolant, wherein the minimum fill line is positioned at a height, H, above a bottom surface of the second degas chamber and the transverse wall is positioned at a height, h, above the bottom surface of the second degas chamber, wherein h<H;
a single dividing wall physically coupled to the transverse wall and extending in a longitudinal direction, wherein the dividing wall fluidly and thermally separates the first and second degas chambers; and
a first degas chamber inlet and a first degas chamber outlet are fluidly coupled to the first degas chamber, wherein a second degas chamber inlet and a second degas chamber outlet are fluidly coupled to the second degas chamber, wherein the first degas chamber inlet and the second degas chamber outlet are arranged at a first side of the single housing and the first degas chamber outlet and the second degas chamber inlet are arranged at a second side of the single housing opposite the first side relative to a longitudinal axis of the single housing parallel to the longitudinal direction.

7. The cooling system of claim 6, wherein a cross-section of the dividing wall taken along a lateral axis of the housing comprises a V-shape, and wherein the dividing wall comprises a first wall and a second wall angled relative to one another and a plane of the transverse wall, further comprising a gap arranged between the first wall and the second wall.

8. The cooling system of claim 6, wherein the first degas chamber inlet is configured to flow coolant from the first coolant circuit to the first degas chamber and the first degas chamber outlet is configured to flow coolant from the first degas chamber to the first coolant circuit.

9. The cooling system of claim 8, wherein the transverse wall comprises a first opening, proximal to the second side, configured to flow coolant from the reservoir to only the first degas chamber, the first opening is further configured to flow gas from the first degas chamber to the reservoir.

10. The cooling system of claim 9, wherein the second degas chamber inlet is configured to flow coolant from the second coolant circuit to the second degas chamber and the second degas chamber outlet is configured to flow coolant from the second degas chamber to the second coolant circuit.

11. The cooling system of claim 10, wherein the transverse wall comprises a second opening, proximal to the first side, configured to flow coolant from the reservoir to only the second degas chamber, the second opening is further configured to flow gas from the second degas chamber to the reservoir.

12. The cooling system of claim 11, wherein gas from the first degas chamber and gas from the second degas chamber exit the housing via a single outlet, wherein gas from the first degas chamber and gas from the second degas chamber mix in the reservoir prior to exiting the housing.

13. The cooling system of claim 11, wherein the first opening is a first plurality of openings and the second opening is a second plurality of openings, wherein the first opening and the second opening are identical in size and shape.

14. The cooling system of claim 6, wherein a volume of the first degas chamber is equal to a volume of the second degas chamber.

15. The cooling system of claim 6, wherein a coolant temperature of coolant in the first coolant circuit is different than a coolant temperature of coolant in the second coolant circuit.

16. The cooling system of claim 6, wherein coolant in the first coolant circuit does not mix with coolant in the second coolant circuit outside of the housing.

17. A hybrid vehicle, comprising:
a first cooling circuit fluidly coupled to a first degas chamber arranged in a housing via a first inlet arranged at a first side of the housing and a first outlet arranged at a second side of the housing opposite the first side relative to a longitudinal axis of the housing, wherein the first outlet is arranged vertically below the first inlet;
a second cooling circuit fluidly coupled to a second degas chamber arranged in the housing via a second inlet arranged at the second side and a second outlet arranged at the first side, wherein the second outlet is arranged vertically below the second inlet;
a reservoir arranged vertically above the first degas chamber and the second degas chamber in the housing, the reservoir configured to maintain a desired volume of the first degas chamber and the second degas chamber;
a transverse wall fluidly separating the reservoir from the first degas chamber and the second degas chamber, the transverse wall arranged vertically below a minimum fill line and submerged in coolant, wherein the minimum fill line is positioned at a height, H, above a bottom surface of the second degas chamber and the transverse wall is positioned at a height, h, above the bottom surface of the second degas chamber, wherein h<H, wherein a first aperture is arranged in the transverse wall and configured to fluidly couple the reservoir to the first degas chamber, wherein coolant flows in a direction of gravity from the reservoir to the first degas chamber and gas flow in a direction opposite gravity from the first degas chamber to the reservoir, further comprising a second aperture arranged in the transverse wall configured to fluidly couple the reservoir to the second degas chamber, wherein coolant flows in the direction of gravity from the reservoir to the second degas chamber and gas flow in the direction opposite gravity from the second degas chamber to the reservoir; and
a single dividing wall traversing an entire longitudinal length of the housing parallel to the longitudinal axis, the dividing wall physically coupled to each of the first side, the second side, and the transverse wall, wherein the dividing wall thermally and fluidly separates the first degas chamber from the second degas chamber.

* * * * *